United States Patent
Lappetelainen et al.

(10) Patent No.: US 9,112,985 B2
(45) Date of Patent: Aug. 18, 2015

(54) METHODS, APPARATUS AND COMPUTER PROGRAM PRODUCT FOR ALTERING DEVICE FUNCTIONALITY

(75) Inventors: Antti Lappetelainen, Espoo (FI); Miika Laaksonen, Espoo (FI)

(73) Assignee: Core Wireless Licensing S.a.r.l, Luxembourg (LU)

(*) Notice: Subject to any disclaimer, the term of this patent is extended or adjusted under 35 U.S.C. 154(b) by 1221 days.

(21) Appl. No.: 11/960,407

(22) Filed: Dec. 19, 2007

(65) Prior Publication Data

US 2009/0164480 A1 Jun. 25, 2009

(51) Int. Cl.
*G06F 9/44* (2006.01)
*G06F 9/445* (2006.01)
*H04M 1/725* (2006.01)

(52) U.S. Cl.
CPC ............. *H04M 1/7253* (2013.01); *G06F 8/65* (2013.01); *H04M 1/72561* (2013.01); *H04M 2250/12* (2013.01)

(58) Field of Classification Search
CPC ..... G06F 11/1412; G06F 8/61; G06F 9/4411; G06F 9/46; G06F 9/542
See application file for complete search history.

(56) References Cited

U.S. PATENT DOCUMENTS

| | | | | |
|---|---|---|---|---|
| 5,956,725 | A * | 9/1999 | Burroughs et al. | 1/1 |
| 6,922,735 | B2 * | 7/2005 | Chang | 710/5 |
| 7,200,387 | B1 * | 4/2007 | Ephraim et al. | 455/418 |
| 7,773,972 | B2 * | 8/2010 | Croome et al. | 455/411 |
| 7,779,404 | B2 * | 8/2010 | Movassaghi et al. | 717/171 |
| 7,797,679 | B2 * | 9/2010 | Tysowski et al. | 717/121 |
| 7,865,777 | B2 * | 1/2011 | Verbowski et al. | 714/37 |
| 7,941,786 | B2 * | 5/2011 | Scott et al. | 717/121 |
| 2001/0027521 | A1 * | 10/2001 | Cromer et al. | 713/191 |
| 2002/0063633 | A1 | 5/2002 | Park | |
| 2004/0049772 | A1 * | 3/2004 | Pantenburg et al. | 717/176 |
| 2004/0127239 | A1 * | 7/2004 | Cho | 455/466 |
| 2004/0205744 | A1 * | 10/2004 | Chang | 717/168 |
| 2004/0215755 | A1 * | 10/2004 | O'Neill | 709/223 |
| 2006/0005167 | A1 * | 1/2006 | Wade | 717/121 |
| 2007/0049198 | A1 * | 3/2007 | Walsh et al. | 455/41.2 |
| 2007/0220518 | A1 * | 9/2007 | Verbowski et al. | 718/102 |
| 2009/0228868 | A1 * | 9/2009 | Drukman et al. | 717/121 |
| 2012/0005664 | A1 * | 1/2012 | Muramatsu | 717/168 |
| 2013/0191819 | A1 * | 7/2013 | Peters | 717/168 |

FOREIGN PATENT DOCUMENTS

EP 1855450 11/2007
WO WO 2007/027270 3/2007

OTHER PUBLICATIONS

Rebecca E. Grinter; Supporting Articulation Work Using Software Configuration Management Systems; 1996 Bell Labs; pp. 447-465; <http://link.springer.com/article/10.1007/BF00136714>.*

(Continued)

*Primary Examiner* — Thuy Dao
*Assistant Examiner* — Cuong V Luu
(74) *Attorney, Agent, or Firm* — Core Wireless Licensing

(57) ABSTRACT

A method, apparatus, system and computer program product are provided which permit the functionality of a device to be adapted or otherwise altered without requiring the device to be completely reprogrammed. In this regard, attributes which at least partially define the functionality of the device may be changed or supplemented in order to correspondingly alter the device functionality which, in turn, at least partially depends upon the attributes stored by the device.

28 Claims, 7 Drawing Sheets

(56) References Cited

OTHER PUBLICATIONS

Anita Sarma et al.; Palantir: Raising Awareness among Configuration Management Workspaces; 2003 IEEE; 11 pages; <http://ieeexplore.ieee.org/stamp/stamp.jsp?tp=&arnumber=1201222>.*

Yi-Min Wang et al.; Strider a black-box state-based approach to change and configuration management and support; 2004 Science of Computer Programming; pp. 143-164; <http://www.sciencedirect.com/science/article/pii/S0167642304000760#>.*

Jacky Estublier et al.; Impact of Software Engineering Research on the Practice of Software Configuration Management; 2005 ACM; pp. 383-430; <http://dl.acm.org/citation.cfm?id=1101817>.*

Jeremy S. Bradbury et al.; A Survey of Self-Management in Dynamic Software Architecture Specifications; 2004 ACM; pp. 28-33; <http://dl.acm.org/citation.cfm?id=1075411>.*

Rebecca E. Grinter; Using a Configuration Management Tool to Coordinate Software Development; 1995 ACM; pp. 168-177; <http://dl.acm.org/citation.cfm?id=224036>.*

International Search Report dated Mar. 27, 2009, International Patent Application No. PCT/IB2008/003025, 25 pages.

* cited by examiner

| Description | UUID | Handle | Value |
|---|---|---|---|
| Vendor | 12343456-0600-8000-1000-00025b000b00 | 0001 | Nokia |
| Type | 87654321-0080-8000-1000-10025b000b00 | 0002 | Motion detector |
| Version | 23456789-5600-8000-1000-20025b000b00 | 0003 | 1.2 |
| Threshold | 98765432-0700-8000-1000-30025b000b00 | 0004 | 23% |
| Delay | 44444444-0340-8000-1000-40025b000b00 | 0005 | 3s |
| Last Activity | 12349876-1000-8000-1000-50025b000b00 | 0006 | 2/28/2007 13:21 |
| Event action | 77778888-0600-8000-1000-60025b000b00 | 0007 | (empty) |
| Detection value | 78778888-0600-8000-1000-60025b000b00 | 0008 | (empty) |
| Detection destination | 12344321-6666-8000-1000-70025b000b00 | 0009 | (empty) |

FIG. 4A.

| Description | UUID | Handle | Value |
|---|---|---|---|
| Vendor | 12343456-0600-8000-1000-00025b000b00 | 0001 | Nokia |
| Type | 87654321-0080-8000-1000-10025b000b00 | 0002 | Motion detector |
| Version | 23456789-5600-8000-1000-20025b000b00 | 0003 | 1.2 |
| Threshold | 98765432-0700-8000-1000-30025b000b00 | 0004 | 23% |
| Delay | 44444444-0340-8000-1000-40025b000b00 | 0005 | 3s |
| Last Activity | 12349876-1000-8000-1000-50025b000b00 | 0006 | 2/28/2007 13:21 |
| Event action | 654321-0600-8000-1000-00025b000b00 | 0007 | (empty) |
| Detection value | 78778888-0600-8000-1000-60025b000b00 | 0008 | Put On |
| Detection destination | 1212ab43ff2e | 0009 | (empty) |

METHODS, APPARATUS AND COMPUTER PROGRAM PRODUCT FOR ALTERING DEVICE FUNCTIONALITY

FIELD OF THE INVENTION

Embodiments of the present invention relate generally to expanding the functionality of an electronic device(s) without necessarily requiring changes to firmware in the electronic device(s), and more particularly, relate to a method, device, and computer program product for generating and obtaining new attributes that may be utilized by the electronic device(s) to expand and/or change a current set of functionalities of the electronic device(s).

BACKGROUND OF THE INVENTION

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices. To facilitate easier or faster information transfer and convenience, many electronic devices utilize firmware which is a combination of software and hardware. For instance, firmware may be a computer program that is embedded in a hardware device. Additionally, firmware may be the programmable content of a hardware device, which may consist of machine language instructions for a processor, or configuration settings for a device. These settings may at least partially define the functionality of an electronic device. Currently, if a manufacturer of an electronic device desires to update the functionality of the electronic device because of changes or additions to the potential functionality of the electronic device that were introduced following the deployment of the electronic device or for some other reason, the parameters, settings, instructions or the like that define the updated functionality of the electronic device may need to be flashed to the firmware of the electronic device. In other words, the settings or parameters relating to the functionality of the electronic device that reside in the firmware (e.g., a read only memory (ROM) and/or flash memory) of the electronic device may need to be re-programmed to update the functionality of the electronic device.

Making changes to firmware such as by re-programming the firmware in an electronic device(s) to change the functionality of an electronic device may be an expensive and time consuming task for a manufacturer, service provider or the like, especially in situations where there are many electronic devices (e.g., mobile phones) deployed in the marketplace.

As such, there is an existing need to be able to update the functionality of an electronic device in a more efficient and cost-effective manner. For example, it would be desirable to be able to update the parameters, settings, instructions or the like that at least partially define the functionality of an electronic device in an efficient manner.

BRIEF SUMMARY OF THE INVENTION

A method, apparatus, system and computer program product are therefore provided which permit the functionality of a device to be adapted or otherwise altered without requiring the device to be completely reprogrammed. In this regard, attributes which at least partially define the functionality of the device may be changed or supplemented in accordance with embodiments of the present invention in order to correspondingly alter the device functionality. As such, the functionality of a plurality of devices can be efficiently updated, even in instances in which a substantial number of devices are already deployed in the field by controllably altering or updating the attributes of the devices which define their functionality.

In one aspect, a method is provided for storing one or more initial attributes which correspond to one or more functions of a first device. In one embodiment, the initial attributes may include one or more Universally Unique Identifiers (UUIDs) having an associated value. The method may also receive at least one other attribute which corresponds to at least one different function of the first device. For example, the at least one other attribute may be received via short-range communication. The method may then store the at least one other attribute while maintaining at least one of the initial attributes. Even though at least one of the initial attributes is maintained, other initial attributes may be overwritten. Thereafter, the different function may be performed with that different function being at least partially corresponding to the at least one other attribute. While various functions may be defined and then performed, one function may include instructing a second device to perform an action.

In another aspect, an apparatus is provided that includes a processing element configured to store one or more initial attributes which correspond to one or more functions of a first device. In one embodiment, the initial attributes may include one or more Universally Unique Identifiers (UUIDs) having an associated value. The processing element may also be configured to receive at least one other attribute which corresponds to at least one different function of the first device. For example, the at least one other attribute may be received via short-range communication. The processing element may be configured store the at least one other attribute while maintaining at least one of the initial attributes. Even though at least one of the initial attributes is maintained, other initial attributes may be overwritten. Thereafter, the processing element may perform a different function with that different function at least partially corresponding to the at least one other attribute. While various functions may be defined and then performed, one function may include instructing a second device to perform an action.

In a further aspect, a computer program product is provided that includes at least one computer-readable storage medium having computer-readable program code portions stored therein. The computer-readable program code portions include a first executable portion configured to store one or more initial attributes which correspond to one or more functions of a first device. In one embodiment, the initial attributes may include one or more Universally Unique Identifiers (UUIDs) having an associated value. The computer-readable program code portions may also include a second executable portion configured to receive at least one other attribute which corresponds to at least one different function of the first device. For example, the at least one other attribute may be received via short-range communication. The computer-readable program code portions may further include a third executable portion configured to store the at least one other attribute while maintaining at least one of the initial attributes. Even though at least one of the initial attributes is maintained, other initial attributes may be overwritten. Thereafter, the computer-readable program code portions may include a fourth executable portion configured to cause a different function to be performed with that different function at least partially corresponding to the at least one other attribute. While various functions may be defined and then performed, one function may include instructing a second device to perform an action.

In yet another aspect, an apparatus is provided that includes a processing element configured to generate one or more initial attributes which correspond to one or more functions of a device. In one embodiment, the initial attributes may include one or more Universally Unique Identifiers (UUIDs). The processing element may also be configured to send the initial attributes to the device. The processing element may also be configured to generate at least one other attribute which corresponds to a different function of the device and may also send the at least one other attribute to the device. Upon receipt of the at least one other attribute, the device is configured to perform a different function with that different function at least partially corresponding to the at least one other attribute.

In accordance with another aspect of the present invention, a method is provided for generating one or more initial attributes which correspond to one or more functions of at least one device. In one embodiment, the initial attributes may include one or more Universally Unique Identifiers (UUIDs). The method may also send the one or more initial attributes to the at least one device and generate at least one other attribute which corresponds to a different function of the at least one device. The method may then send the at least one other attribute to the at least one device. Thereafter, the different function may be performed by the device with that different function at least partially corresponding to the at least one other attribute.

In yet another aspect, a method is providing for receiving at least one attribute which corresponds to at least one different function of an electronic device. The electronic device stores one or more initial attributes which correspond to one or more functions of the electronic device. The method further comprises sending the at least one other attribute to the electronic device, which performs the different function corresponding to the at least one attribute while maintaining at least one of the initial attributes.

BRIEF DESCRIPTION OF THE SEVERAL VIEWS OF THE DRAWINGS

Figure 1:
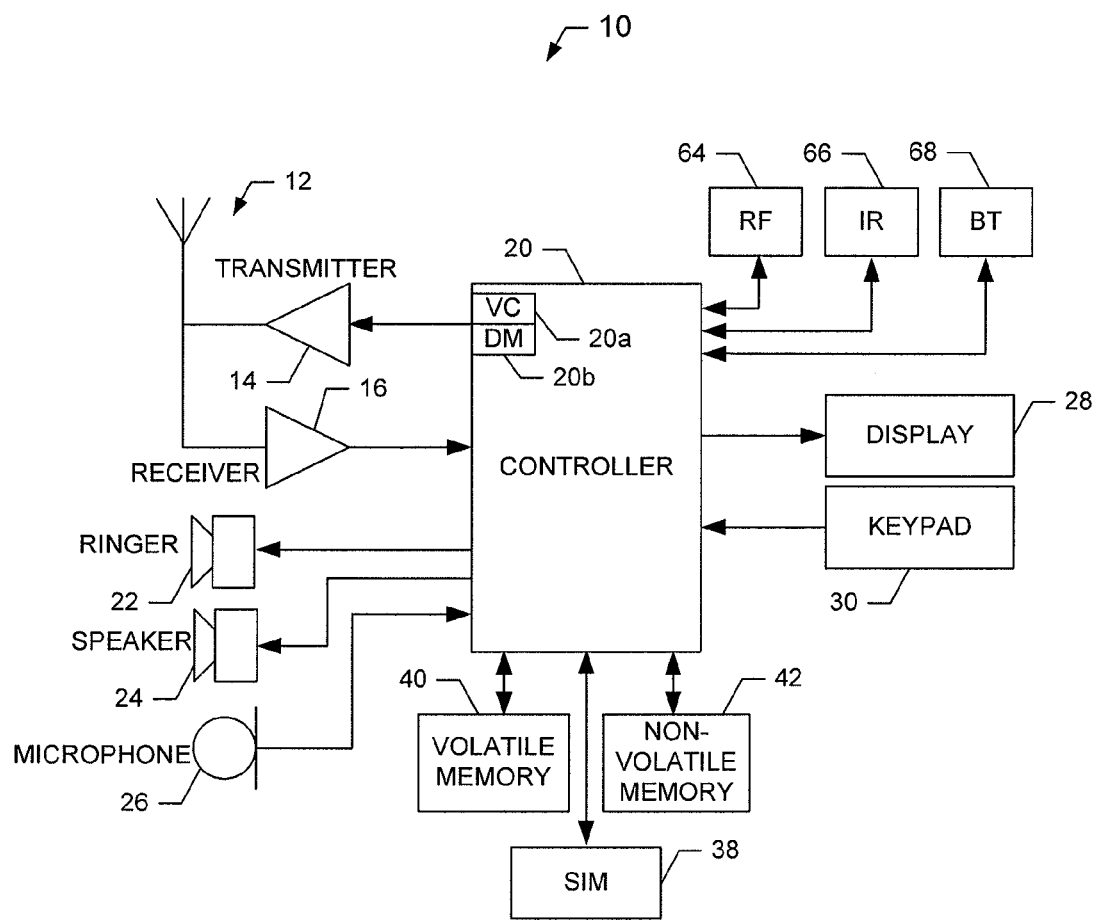
Figure 2:
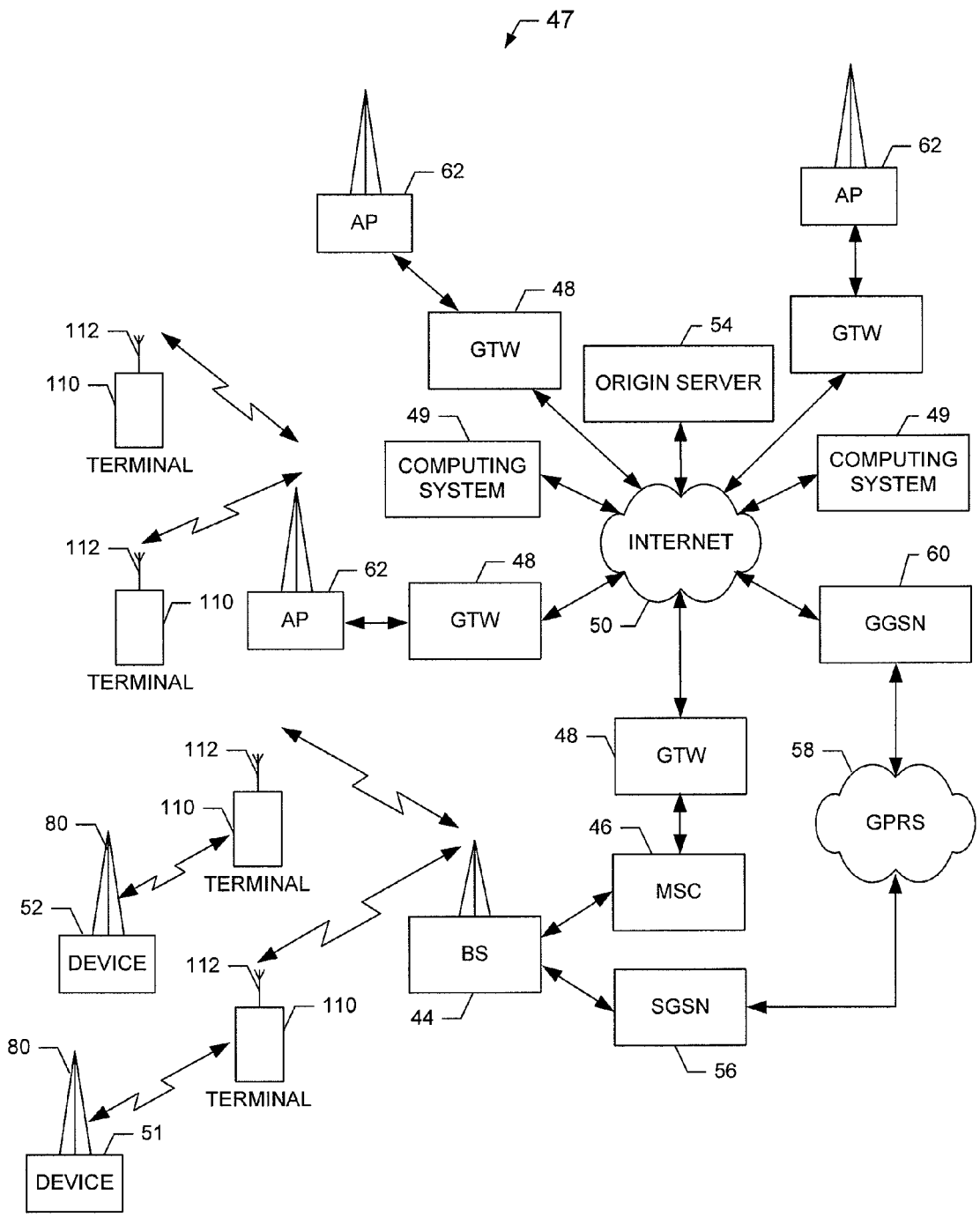
Figure 3:
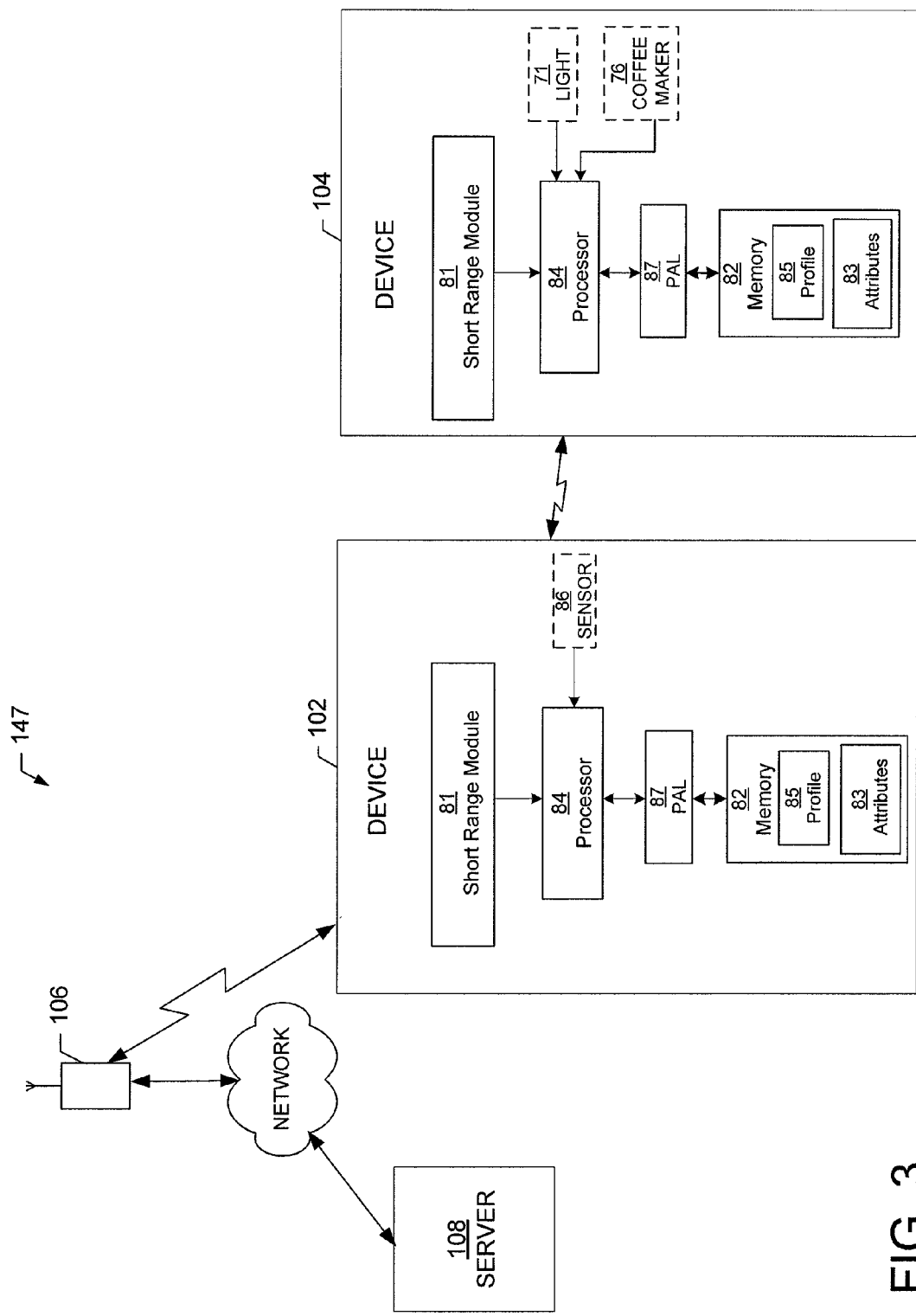
Figure 5:
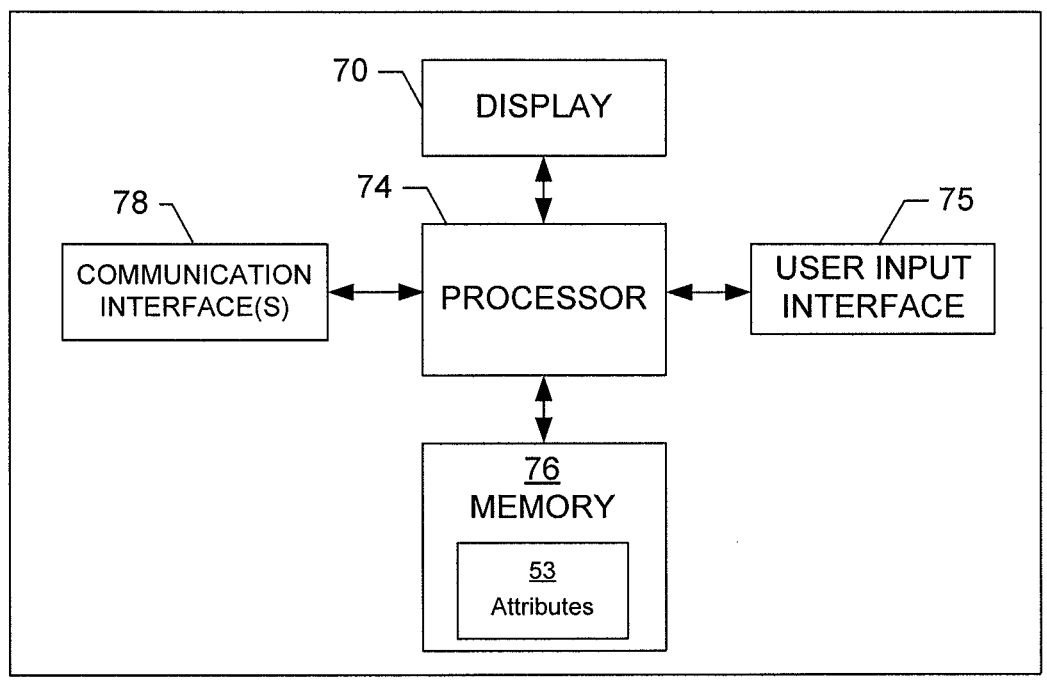
Figure 6:
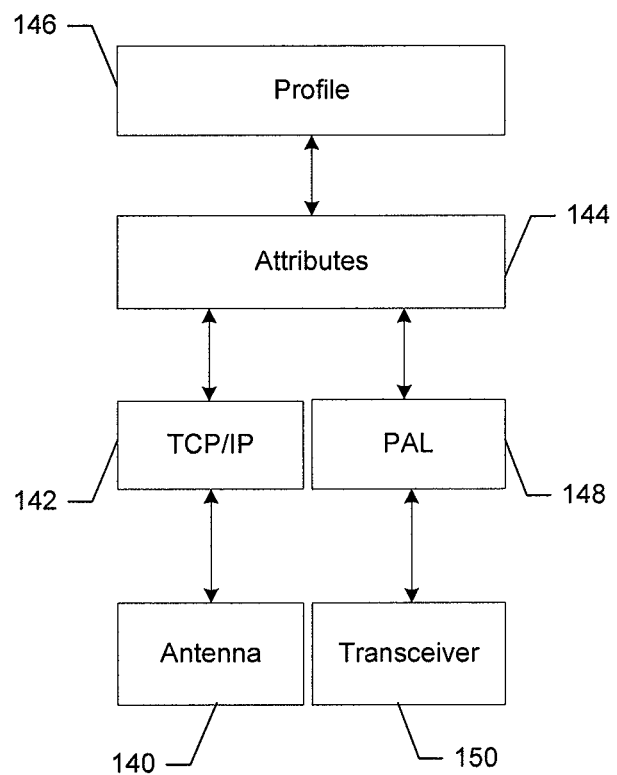
Figure 7:
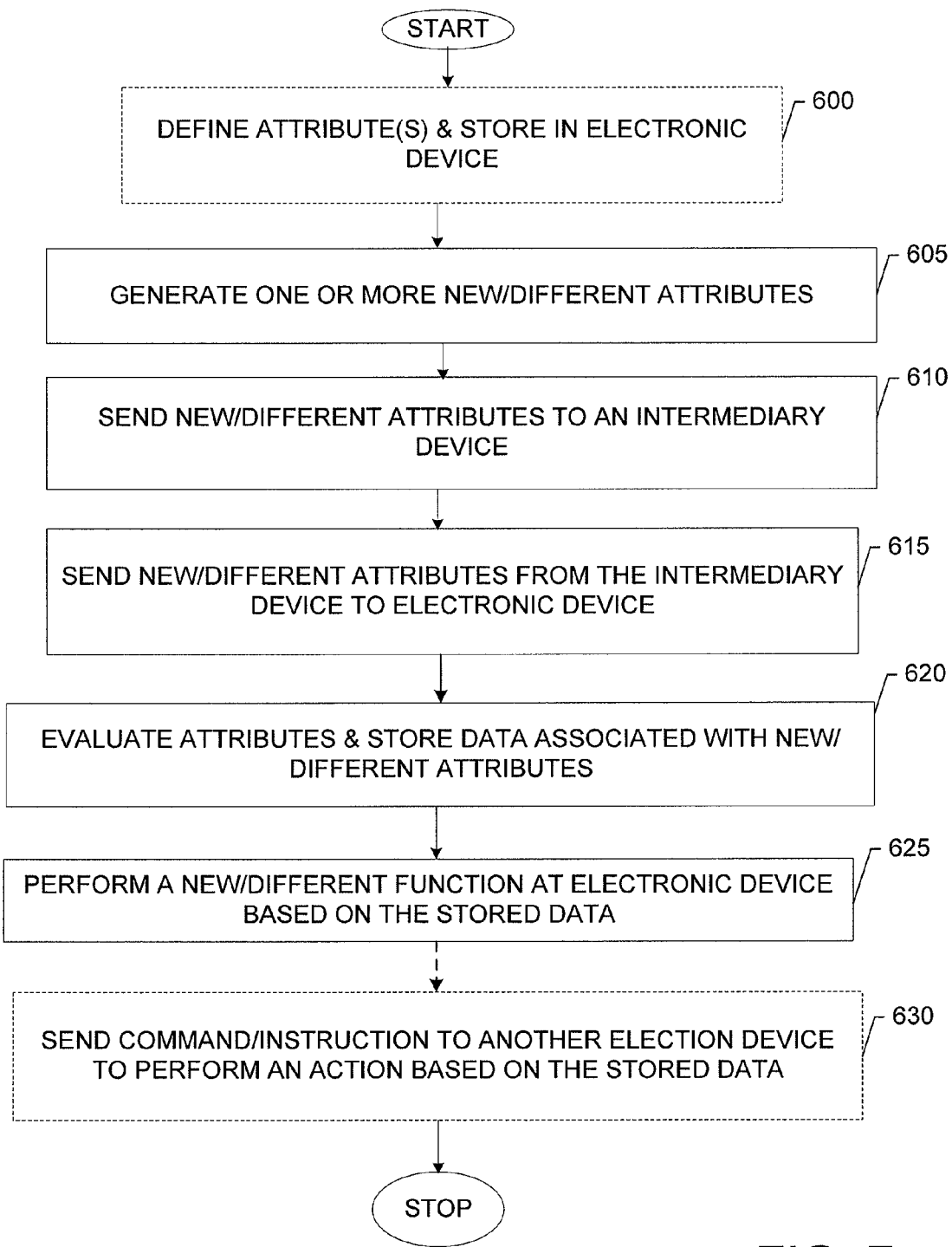

Having thus described the invention in general terms, reference will now be made to the accompanying drawings, which are not necessarily drawn to scale, and wherein:

FIG. 1 is a schematic block diagram of an electronic device, such as a mobile terminal, according to an exemplary embodiment of the present invention;

FIG. 2 is a schematic block diagram of a wireless communication system according to an exemplary embodiment of the present invention;

FIG. 3 is a schematic block diagram of a system for updating/expanding attributes of an electronic device according to an exemplary embodiment of the present invention;

FIG. 4A is a representation of Wibree™ attributes that define motion detection functionality of an electronic device(s) according to an exemplary embodiment of the present invention;

FIG. 4B is a representation of the Wibree™ attributes that define motion detection functionality of an electronic device(s) following updating of the attributes according to an exemplary embodiment of the present invention;

FIG. 5 is a schematic block diagram of an apparatus according to an exemplary embodiment of the present invention;

FIG. 6 is another representation of a portion of an electronic device, such as a mobile terminal, which may communicate both via a wide area network, such as via TCP/IP, and via a short range communications link, such as via a Wibree™ protocol, according to an exemplary embodiment of the present invention; and FIG. 7 is a flowchart for updating/expanding attributes of an electronic device according to an exemplary embodiment of the present invention.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates a block diagram of a mobile terminal 10 that may benefit from the present invention. It should be understood, however, that the mobile terminal illustrated and hereinafter described is merely illustrative of one type of electronic device that may benefit from the present invention and, therefore, should not be taken to limit the scope of the present invention. While several embodiments of the electronic device are illustrated and will be hereinafter described for purposes of example, other types of electronic devices, such as portable digital assistants (PDAs), pagers, laptop computers, desktop computers, gaming devices, televisions, and other types of electronic systems, may employ the present invention.

As shown, the mobile terminal 10 includes an antenna 12 in communication with a transmitter 14, and a receiver 16. The mobile terminal also includes a controller 20 or other processor that provides signals to and receives signals from the transmitter and receiver, respectively. These signals may include signaling information in accordance with an air interface standard of an applicable cellular system, and/or any number of different wireless networking techniques, comprising but not limited to Wireless-Fidelity (Wi-Fi), wireless LAN (WLAN) techniques such as IEEE 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (TDMA), GSM, and IS-95 (CDMA). Also, for example, the mobile terminal may be capable of operating in accordance with 2.5G wireless communication protocols GPRS, EDGE, or the like. Further, for example, the mobile terminal may be capable of operating in accordance with 3G wireless communication protocols such as UMTS network employing WCDMA radio access technology. Some NAMPS, as well as TACS, mobile terminals may also benefit from the teaching of this invention, as should dual or higher mode phones (e.g., digital/analog or TDMA/CDMA/analog phones). Additionally, the mobile terminal 10 may be capable of operating according to Wireless Fidelity (Wi-Fi) protocols.

It is understood that the controller 20 may comprise the circuitry required for implementing audio and logic functions of the mobile terminal 10. For example, the controller 20 may be a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 22a, an internal data modem (DM) 22b, and/or the like. Further, the controller may comprise functionality to operate one or more software programs, which may be stored in memory. For example, the controller 20 may be capable of operating a connectivity program, such as a Web browser. The connectivity program may allow the mobile terminal 10 to transmit and receive Web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive Web content across Internet 50.

The mobile terminal 10 may also comprise a user interface including a conventional earphone or speaker 24, a ringer 22, a microphone 26, a display 28, a user input interface, and/or the like, which may be coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise conventional numeric (0-9) and related keys (#, *), and/or other keys for operating the mobile terminal.

As shown in FIG. 1, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example an infrared (IR) transceiver 66, a Bluetooth™ (BT) transceiver 68 operating using Bluetooth™ brand wireless technology developed by the Bluetooth™ Special Interest Group, and/or the like. The Bluetooth transceiver 68 may be capable of operating according to Wibree™ radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. In this regard, the mobile terminal may comprise volatile memory 40, such as volatile Random Access Memory (RAM), which may comprise a cache area for temporary storage of data. The mobile terminal may comprise other non-volatile memory 42, which may be embedded and/or may be removable. The non-volatile memory may comprise an EEPROM, flash memory, and/or the like. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Referring now to FIG. 2, an illustration of one type of system that could support communications to and from an electronic device, such as the mobile terminal of FIG. 1, is provided by way of example, but not of limitation. As shown, one or more mobile terminals 110 may each include an antenna 112 for transmitting signals to and for receiving signals from a base site or base station (BS) 44. The base station 44 may be a part of one or more cellular or mobile networks each of which may comprise elements required to operate the network, such as a mobile switching center (MSC) 46. As well known to those skilled in the art, the mobile network may also be referred to as a Base Station/MSC/Interworking function (BMI). In operation, the MSC 46 may be capable of routing calls to and from the mobile terminal 110 when the mobile terminal 110 is making and receiving calls. The MSC 46 may also provide a connection to landline trunks when the mobile terminal 110 is involved in a call. In addition, the MSC 46 may be capable of controlling the forwarding of messages to and from the mobile terminal 110, and may also control the forwarding of messages for the mobile terminal 110 to and from a messaging center. It should be noted that although the MSC 46 is shown in the system of FIG. 2, the MSC 46 is merely an exemplary network device and the present invention is not limited to use in a network employing an MSC.

The MSC 46 may be coupled to a data network, such as a local area network (LAN), a metropolitan area network (MAN), and/or a wide area network (WAN). The MSC 46 may be directly coupled to the data network. In one typical embodiment, however, the MSC 46 may be coupled to a GTW 48, and the GTW 48 may be coupled to a WAN, such as the Internet 50. In turn, devices such as processing elements (e.g., personal computers, server computers or the like) may be coupled to the mobile terminal 110 via the Internet 50. For example, as explained below, the processing elements may include one or more processing elements associated with a computing system 49 (two shown in FIG. 2), origin server 54 (one shown in FIG. 2) or the like, as described below.

As shown in FIG. 2, the BS 44 may also be coupled to a signaling GPRS (General Packet Radio Service) support node (SGSN) 56. As known to those skilled in the art, the SGSN 56 may be capable of performing functions similar to the MSC 46 for packet switched services. The SGSN 56, like the MSC 46, may be coupled to a data network, such as the Internet 50. The SGSN 56 may be directly coupled to the data network. Alternatively, the SGSN 56 may be coupled to a packet-switched core network, such as a GPRS core network 58. The packet-switched core network may then be coupled to another GTW 48, such as a GTW GPRS support node (GGSN) 60, and the GGSN 60 may be coupled to the Internet 50. In addition to the GGSN 60, the packet-switched core network may also be coupled to a GTW 48. Also, the GGSN 60 may be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 110 to and from the messaging center.

In addition, by coupling the SGSN 56 to the GPRS core network 58 and the GGSN 60, devices such as a computing system 49 and/or origin server 54 may be coupled to the mobile terminal 110 via the Internet 50, SGSN 56 and GGSN 60. In this regard, devices such as the computing system 49 and/or origin server 54 may communicate with the mobile terminal 110 across the SGSN 56, GPRS core network 58 and the GGSN 60. By directly or indirectly connecting mobile terminals 110 and the other devices (e.g., computing system 49, origin server 54, etc.) to the Internet 50, the mobile terminals 110 may communicate with the other devices and with one another, such as according to the Hypertext Transfer Protocol (HTTP), to thereby carry out various functions of the mobile terminals 110.

Although not every element of every possible mobile network is shown in FIG. 2 and described herein, it should be appreciated that electronic devices, such as the mobile terminal 110, may be coupled to one or more of any of a number of different networks through the BS 44. In this regard, the network(s) may be capable of supporting communication in accordance with any one or more of a number of first-generation (1G), second-generation (2G), 2.5G, third-generation (3G), fourth generation (4G) and/or future mobile communication protocols or the like. For example, one or more of the network(s) may be capable of supporting communication in accordance with 2G wireless communication protocols IS-136 (TDMA), GSM, and IS-95 (CDMA). Also, for example, one or more of the network(s) may be capable of supporting communication in accordance with 2.5G wireless communication protocols GPRS, Enhanced Data GSM Environment (EDGE), or the like. Further, for example, one or more of the network(s) may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile terminals (e.g., digital/analog or TDMA/CDMA/analog phones).

As depicted in FIG. 2, the mobile terminal 110 may further be coupled to one or more wireless access points (APs) 62. The APs 62 may comprise access points configured to communicate with the mobile terminal 110 in accordance with techniques such as, for example, radio frequency (RF), Bluetooth™ (BT), infrared (IrDA) or any of a number of different wireless networking techniques, including wireless LAN (WLAN) techniques such as IEEE 802.11 (e.g., 802.11a, 802.11b, 802.11g, 802.11n, etc.), Wibree™ techniques, WiMAX techniques such as IEEE 802.16, Wireless-Fidelity (Wi-Fi) techniques and/or ultra wideband (UWB) techniques such as IEEE 802.15 or the like. The APs 62 may be coupled to the Internet 50. Like with the MSC 46, the APs 62 may be directly coupled to the Internet 50. In one embodiment, however, the APs 62 may be indirectly coupled to the Internet 50 via a GTW 48. Furthermore, in one embodiment, the BS 44 may be considered as another AP 62. As will be appreciated, by directly or indirectly connecting the mobile terminals 110 and the computing system 49, the origin server 54, and/or any of a number of other devices, to the Internet 50, the mobile terminals 110 may communicate with one another, the computing system, etc., to thereby carry out various functions of the mobile terminals 110, such as to transmit data, content or the like to, and/or receive content, data or the like from, the computing system 49. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 110 to computing systems 49 and/or origin server 54 across the Internet 50, the mobile terminal 110, computing system 49 and origin server 54 may be coupled to one another and communicate in accordance with, for example, RF, BT, IrDA or any of a number of different wireline or wireless communication techniques, including LAN, WLAN, WiMAX, Wireless Fidelity (Wi-Fi), Wibree™ and/or UWB techniques. One or more of the computing systems 49 may additionally, or alternatively, include a removable memory capable of storing content, which can thereafter be transferred to the mobile terminal 110. Further, the mobile terminal 110 may be coupled to one or more electronic devices, such as printers, digital projectors and/or other multimedia capturing, producing and/or storing devices (e.g., other terminals). Like with the computing systems 49, the mobile terminal 110 may be configured to communicate with the portable electronic devices in accordance with techniques such as, for example, RF, BT, IrDA or any of a number of different wireline or wireless communication techniques, including USB, LAN, Wibree™, Wi-Fi, WLAN, WiMAX and/or UWB techniques. In this regard, the mobile terminal 110 may be capable of communicating with other devices via short-range communication techniques. For instance, the mobile terminal 110 may be in wireless short-range communication with one or more devices 51 that are equipped with a short-range communication transceiver 80. The electronic devices 51 can comprise any of a number of different devices and transponders capable of transmitting and/or receiving data in accordance with any of a number of different short-range communication techniques including but not limited to Bluetooth™, RFID, IR, WLAN, Infrared Data Association (IrDA) or the like. The electronic device 51 may include any of a number of different mobile or stationary devices, including other mobile terminals, wireless accessories, appliances, portable digital assistants (PDAs), pagers, laptop computers, motion sensors, light switches and other types of electronic devices.

Referring now to FIG. 3, a block diagram of a system 147 for updating the attributes of an electronic device is provided. As described below, the attributes of an electronic device generally define, or at least partially define, the functionality of the electronic device. The system 147 may include one or more electronic devices 102 and 104 as well as one or more intermediary devices 106, such as one or more mobile terminals, and one or more servers 108, although only one mobile terminal intermediary device and one server 108 are shown in FIG. 3 for illustration purposes. In an exemplary alternative embodiment, the intermediary device 106 and the server 108 may be embodied in a single component such as a computing device or an integrated circuit(s) such as for example, an application specific integrated circuit (ASIC). Additionally, while two electronic devices 102 and 104 are shown in FIG. 3, the system may include any number of devices which may communicate with each other and/or with the intermediary device 106. As described below, the attributes of one or more of the electronic devices may be updated by the server, which provides the updated attributes to the intermediary device which, in turn, forwards the updated attributes to the electronic device(s).

As shown in FIG. 3, the electronic device 102 (for example, a motion detector) may be capable of including a memory 82 which may comprise volatile and/or non-volatile memory, and may be capable of storing content, data, information and/or the like. For example, the memory 82 may store content transmitted from, and/or received by, the intermediary device 106 and/or another electronic device 104. The memory 82 may include a profile 85 which may define, or at least partially define, a function of the electronic device 102. In instances in which the electronic device 102 is a sensor, for example, the profile 85 may be a sensor profile. The profile 85 may be comprised of one or more attributes 83 that collectively define a function of the electronic device. The attributes, in turn, may be dictated by the protocol in accordance with the electronic device is designed to communicate and operate. For example, an electronic device 102 configured to communicate via Bluetooth™ technology may include a profile that includes store one or more Wibree™ attributes which define the functionalities of the electronic device 102. In this example, these attributes may consist of Wibree™ attributes which consist of a standardized Wibree™ attribute protocol (ATP) for low power Bluetooth™ devices.

The electronic device 102 may also comprise a transceiver, such as a short range communication module 81 (also referred to herein, in one example, as a Bluetooth™ transceiver). The short range communication module 81 may also be capable of operating in one or more predefined frequency bands, such as the 2.4 GHz frequency band in one embodiment. The short range communication module 81 may be capable of communicating with other electronic devices, such as, for example, the intermediary device 106 and other electronic devices such as electronic device 104, according to a predefined protocol. In embodiments in which the short range communication module 81 may communicate in accordance with Bluetooth™ techniques, for instance, the short range communication module 81 may be capable of transmitting/receiving data to/from the intermediary device 106 and/or the short range communication module 81 of another electronic device 104 according to a Wibree™ protocol. As shown in FIG. 3, the electronic device 102 may comprise a profile adaptation layer (PAL) 87, such as a Wibree™ Profile Adaptation Layer (PAL), which may be embodied by software, for facilitating communication by the short range module 81 in accordance with the attributes. As described below, the short range module 81 of electronic device 102 may also be capable of receiving attributes, such as for example Wibree™ attributes, from the intermediary device 106 for defining the functionality of the electronic device. The attributes that are received by the short range module 81 may then be provided by the protocol adaptation layer 87 to memory 82 for storage. In an exemplary embodiment in which the attributes are Wibree attributes, the Wibree™ attributes received by the short range module may be stored in memory as Wibree attributes which, in turn, at least partially define the profile 85 of the electronic device 102.

The electronic device 102 may optionally comprise a processor 84 for controlling operations of the electronic device and a sensor 86 which may be capable of detecting motion of an entity, person or the like by sensing physical movement in a specified area. The sensor 86 may detect the motion and send signals to the processor 84 which may be capable of measuring change in speed and/or a vector of an object(s) in the field of view of the sensor 86, for example. The data associated with the motion or movement detected by the sensor 86 may also be provided to and stored in memory 82, such as in or in association with a profile 85 such as, for example, a sensor profile. The processor 84 may also be involved in the short range module 81 sending the data associated with detected motion or a movement to the intermediary device 106, such as a mobile terminal. Additionally, profile 85 may contain instructions or otherwise define subsequent actions to be taken based on the detection of movement by the sensor 86. For example, the profile may include directions to send a signal to another electronic device, such as electronic device 104, when the sensor 86 detects movement. As such, when the sensor 86 of electronic device 102 detects movement, the processor 84 may reference the profile 85 to determine any subsequent action and, based on the profile, may send a signal to another electronic device, such as electronic device 104, which may instruct the electronic device 104 to perform one or more actions. In an alternative exemplary embodiment, the sensor 86 may optionally detect light as well as other forms of electromagnetic energy and when the sensor 86 detects a predetermined amount of light, the sensor is able to send an indication to the processor 84 of the electronic device 102 specifying that the predetermined amount of light has been detected. This indication may also serve as a trigger by the processor 84 to perform some action such as sending a message, command or signal to the intermediary device as described more fully below. Electronic device 104 may be any of a variety of devices, but in the illustrated embodiment, the electronic device 104 includes some of the same components as electronic device 102, including, for example, a short range module 81, a processor 84, a memory 82 including a profile 85 and a number of attributes 83 and a protocol adaptation layer 87. In contrast to a sensor, however, the electronic device 104 may comprise some other mechanism, such as a coffee maker 76 and/or a light 71 which make coffee in an automated fashion and which provide illumination, respectively, as known to those skilled in the art.

In one embodiment, when the sensor 86 of electronic device 102 detects movement of an object within the field of view of the sensor 86, the processor 84 may retrieve instructions from or may otherwise reference the profile 85 and based at least in part on the direction provided by the profile, the processor may instruct the short range module 81 to send a command to another electronic device such as electronic device 104 to turn on the coffee maker 76, or to perform any other suitable action. For instance, in an alternative exemplary embodiment in which the device 104 also includes a light 71, the electronic device 102 may instruct the electronic device 104 to turn on the light 71 in response to the detection of movement of an object within the field of view of the sensor 86. In this regard, it should be pointed out that the electronic device 104 may have various mechanisms capable of performing any suitable action and is not limited to making coffee or turning on a light. Rather these are examples for purposes of illustration and not of limitation.

While the functionality of the electronic devices 102, 104 may be defined by any of a variety of types of attributes, the electronic devices of one embodiment may communicate in accordance with Bluetooth techniques and, as a result, may have functions defined by Wibree attributes. In an exemplary embodiment the functions defined by the attributes include but are not limited to: (1) changing a communication interval of the electronic devices; (2) changing parameter values that trigger a communication event with the electronic devices; (3) adding a new destination device for communication with an electronic device(s); (4) deleting a destination device for communication with an electronic device(s); (4) instructions for presenting a payload format to be transmitted by a device to one or more of the electronic devices; and (5) instructions regarding the manner in which to react to payload formats received from another device, as well as any other suitable functions.

An example of modifying the functionalities of the electronic devices by utilizing attributes according to an alternative exemplary embodiment will now be provided. In particular, electronic device 102 may store one or more attributes such as "MyWebPage" in its memory 82. A user operating intermediary device 106 may utilize a short range transceiver such as a Bluetooth transceiver to connect the electronic device 102 with the intermediary device when the intermediary device is within a predetermined range of the electronic device 102, for example. When the electronic device 102 is connected to the intermediary device 106, the electronic device 102 may utilize its short range module 81 to send a value such as a uniform resource locator (URL) of the attribute "MyWebPage" to the intermediary device 106. Once the intermediary device 106 receives the URL of the attribute "MyWebPage" the intermediary device may forward the URL to the server 108 which retrieves Web content such as a Web page associated with the received URL.

The server 108 may then send the retrieved Web page to the intermediary device 106, which utilizes its Web browser to display the Web page that shows one or more choices for configuring the functionality of the electronic device 102. These choices may be listed in a menu on a display such as display 28 for example. The choices may include but are not limited to data specifying that the sensor 86 of electronic device 102 may function as an alarm, siren, timer, etc. or operate according to any other suitable function. In this regard, the user of the intermediary device 106 may utilize the keypad 30 or the user input interface of the intermediary device 106 to select one of the choices. Each of the choices may correspond to one or more attributes that are associated with a functionality of the electronic device and which may be stored in a memory of the intermediary device 106.

It should be pointed out that the Web browser of the intermediary device 106 may execute a code such as for example Java™ that modifies the attributes which are to be sent to electronic device 102 based on the selected choice. Additionally, the Web browser of the intermediary device 106 may install a host application on the intermediary device 106 in accordance with the selected functionality. Consider a situation in which the user of the intermediary device 106 selects a choice to change the functionality of the electronic device 102 to an alarm. In this regard, the sensor 86 may detect a predetermined amount of light such as for example a level of light generated by the sun during a particular time of the day (e.g., sunset) and may serve as a trigger to send a signal to the processor 84 of the electronic device 102 which instructs the electronic device 102 to send a message such as a multimedia messaging service (MMS) message, short message service (SMS) message, etc. to the intermediary device 106. The SMS message may consist of any suitable message. For instance, in this example the SMS message may consist of an indication instructing a child of the user, who may currently have possession of the intermediary device 106, that it is time to come home.

Referring now to FIG. 4A, a representation of a number of Wibree™ attributes that may define the functionality of an electronic device(s) 102,104 is provided. The Wibree™ attributes may be pre-loaded in memory 82 of the devices 102 and 104 and may conform to a standardized Wibree™ Attribute Protocol (ATP) for Bluetooth™ devices. The Wibree™ attributes may at least partially define a function of an electronic device and each Wibree attribute may be identified by a Universally Unique Identifier (UUID). The UUIDs may be used to uniquely identify every attribute of an electronic device and the UUIDs may be created by a person such as a network operator or the like and distributed to respective electronic devices such as, for example, electronic devices 102 and 104. The UUIDs may consist of a predefined number of bits, such as 128 bits.

As shown in FIG. 4A, the Wibree™ attributes of one embodiment may have descriptions including but not limited to Vendor, Type, Version, Threshold, Delay, Last Activity, Event Action, Detection value, and Detection destination. In this exemplary embodiment, the Wibree™ attributes may also include nine different UUIDs corresponding to the nine attributes (e.g., Vendor, Type, Version, etc.). The Wibree™ attributes may comprise nine handles and one or more values corresponding to the descriptions. However, it should be pointed out that the Wibree™ attributes may consist of any suitable number of UUIDs, handles, values, descriptions and other data. As shown in FIG. 4A, a unique handle is assigned to each UUID, such as by mapping UUIDs to corresponding handles during the initialization of the electronic device. This mapping may be performed in various manners, but in one embodiment, the handles may be assigned based on the order of the UUIDs with the first UUID being associated with a handle having a value of 1, the second UUID being associated with a handle having a value of 2, and so on. Based on the unique relationship between a UUID and a handle, UUID(s) can be referenced, such as by the processor 84, by using the attribute handle to identify the respective UUID.

With reference again to the example of the Wibree attributes provided by FIG. 4A, the value field of the Wibree™ attributes which may relate to the device 102, 104 identifies the Vendor of the device as Nokia, the Type of the device as a motion detector and the Version of the motion detector as 1.2. The Threshold of the motion detector is defined to be 23%. In this regard, the motion detector may ignore any movement corresponding to a value that is less than or equal to 23% so that the motion detector is not overly sensitive. Additionally, the motion detector has a Delay of 3 seconds such that it typically does not perform an action (such as for example sending a command to device 104 to make coffee) until the time period associated with the delay has expired, in this example 3 seconds. Also, the Last Activity of the motion detector was Feb. 28, 2007 at 1:21 pm (i.e., 13:21). The values corresponding to the event action, detection value and detection destination descriptions may be empty, as shown in FIG. 4A.

In accordance with embodiments of the present invention, the server 108 of FIG. 3 may desire to modify, add to or otherwise change the attributes that govern the functionality of one or more of the electronic devices 102. As such, the server 108 may provide the updated or otherwise different attributes to the intermediary device 106 via a wide area network. The intermediary device 106 may then transmit the updated or otherwise different attributes to the electronic device(s) 102 via a short range communications technique.

Referring now to FIG. 5, a block diagram of one example of a server, such as server 108 of FIG. 3, is provided. Although the server may be located at different locations within the network, the origin server 54 and/or computer system 49 of the system depicted in FIG. 2 may function as the server in accordance with one embodiment of the present invention. As shown in FIG. 5, the server generally includes a processor 74 and an associated memory 76. The memory 76 may comprise volatile and/or non-volatile memory, and may store content, data, and/or the like. For example, the memory may store content, data, information, and/or the like transmitted from, and/or received by, the server. The memory 76 may store one or more attributes that relate to the functionality of one or more electronic devices 102, 104. As described above, the attributes may be Wibree™ attributes that conform to a standardized Wibree™ attribute protocol (ATP) for Bluetooth™ devices in accordance with one embodiment. Also for example, the memory 76 may store client applications, instructions, and/or the like for the processor 74 to perform the various operations of the server in accordance with embodiments of the present invention.

In addition to the memory 76, the processor 74 may also be connected to at least one interface or other means for displaying, transmitting and/or receiving data, content, and/or the like. In this regard, the interface(s) may comprise at least one communication interface 78 or other means for transmitting and/or receiving data, content, and/or the like, as well as at least one user interface that may comprise a display 70 and/or a user input interface 75. The user input interface 75, in turn, may comprise any of a number of devices allowing the entity to receive data from a user, such as a keypad, a touch display, a joystick or other input device.

In order to update or change the attributes of an electronic device 102, new and/or modified attributes relating to the functionality of an electronic device may be generated at the server of FIG. 5 by processor 74, or by an operator or the like utilizing user input interface 75, or the new and/or modified attributes may be provided to the server from another network entity. Alternately, the processor 74 may automatically generate new attributes based on, for example, rules that may be defined by an operator. The server, for example server 108, may then transmit the attributes to an intermediary device, for example intermediary device 106, via a wide area network, as shown in FIG. 3. In one embodiment, the intermediary device 106 may be a mobile terminal, such as depicted in FIG. 1 and described above. The intermediary device 106 may be configured to receive the attributes from the server 108 via a wide area network and to then transmit the attributes to the electronic device 102 via a short range communication technique.

In one embodiment in which the server 108 and the intermediary device 106 communicate via the Internet or other packet switched network and the electronic device 102 and the intermediary device 106 communicate via Bluetooth techniques, that portion of the intermediary device that relates to the relay of the attributes may be schematically represented as shown in FIG. 6. In this regard, the intermediary device 106 may include an antenna 140 for transmitting signaling information to and/or receiving signaling information from the server in accordance with at least one air interface standard of an applicable cellular system and/or a wireless networking technique, for example Wi-Fi, WLAN, IEEE 802.11, and/or the like. For instance, the server 108 may provide the intermediary device 106 with data that includes one or more attributes, such as one or more Wibree™ attributes that define or further define the functionality of one or more electronic devices. Although the server 108 and the intermediary device 106 may communicate in accordance with a variety of protocols, the server and the intermediary device may be configured to communicate via the Internet or other packet switched network in accordance with TCP/IP, as reflected by block 142 of FIG. 6. The attributes provided by the server may then be stored by the intermediary device as reflected by block 144. In some embodiments, the intermediary device may maintain a profile 146 of the associated electronic device and, as such, the intermediary device may update the profile in accordance with the attributes provided by the server. In embodiments in which a mobile terminal 10 of FIG. 1 serves as the intermediary device, the attributes and the profile may be stored in one or more of the memories 40 and 42. Following receipt of the attributes, the intermediary device 106 may transmit the attributes to one or more electronic devices 102 via a short range communication technique. In the embodiment depicted in FIG. 6, the intermediary device and the electronic devices may communicate via Bluetooth techniques with the attributes being correspondingly defined as Wibree attributes. As such, the intermediary device of the illustrated embodiment may include a profile adaptation layer (PAL) 148, such as a Wibree™ Profile Adaptation Layer (PAL), a transceiver 150, such as a Bluetooth transceiver, in order to send the attributes to the electronic devices, thereby permitting the electronic device(s) to update the attributes that define their functionality.

In order to provide an example, reference is made again to the Wibree attributes depicted in FIG. 4A and stored in electronic device 102. However, in relation to the system architecture of FIG. 3, it is now desired to modify the attributes to alter the functionality of the electronic device 102 such that the electronic device 102 will alert electronic device 104 in the event that the sensor detects motion and cause electronic device 104 to turn on a light. In this regard, the server may transmit updated attributes that define the UUID associated with the Event action to be the UUID associated with a light switch, e.g., 654321-0600-8000-1000-60025b000b00, define the detection value to be "Put On" and define the detection destination to be 1212ab43ff23, that is, the address of electronic device 104. The intermediary device 106 may then transmit the updated attributes to electronic device 102 via short range communications, e.g., Bluetooth. The electronic device 102, in turn, stores the updated attributes and updates the profile 85. As shown in the example of FIG. 4B, the processor 84 of the electronic device 102 may receive the Wibree™ attribute(s) 53 from transceiver 80 and execute a write command to write the UUID for a light switch (e.g., 654321-0600-8000-1000-00025b000b00 in this example) to the Event action handle, e.g., handle 0007, to write "Put On" to the Detection value handle, e.g., handle 0008, and to write the address of the other electronic device 104, e.g., 1212ab43ff2e, to the Detection destination handle, e.g., handle 0009. The value written to the Detection destination handle, e.g., handle 0009, may correspond to an Internet Protocol (IP) address of the electronic device 104.

In this example, when the Wibree™ attribute(s) 83 have been updated as described above and as shown in FIG. 4B, the sensor 86 of electronic device 102 is capable of operating as a light switch. For instance, when the sensor 86 detects motion, the processor 84 is capable of sending a command to device 52 to turn on the light 71.

Referring to FIG. 7, a flowchart is provided for updating or otherwise modifying the attributes of an electronic device and, as a result, altering the functionality of the electronic device. Optionally, at operation 600, one or more attributes are defined and stored by an electronic device such as for example electronic device 102. It should be pointed out that the attributes may be pre-stored by the electronic device. In one embodiment, the attributes may be Wibree™ attributes which may consist of UUIDs and other data relating to the functionalities (e.g., a motion detector detecting movement/motion) of the electronic device, as discussed above. At operation 605, one or more additional or different attributes 53 may be defined, such as by being generated by or provided to a server 108. At operation 610, the attributes may be sent from server 108 to one or more intermediary devices 106, such as a mobile terminal 10. At operation 615, one or more of the attributes may then be sent from the intermediary device to the electronic device 102.

At operation 620, the electronic device 102 is capable of evaluating the received attributes and storing the corresponding attributes for future reference. At operation 625, after storing the updated or otherwise modified attributes, the electronic device 102 may be capable of performing one or more different or new functions (e.g., turn on a light switch) based on the updated or modified attributes. At operation 630, for example, the electronic device 102 of some embodiments may send a command, instruction or the like to another electronic device 104 to perform an action (e.g., turn on a light) based on the functionality defined by the updated or otherwise modified attributes.

It should be understood that each block or step of the flowchart, shown in FIG. 7 and combination of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus (e.g., hardware) means for implementing the functions implemented specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the functions specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions that are carried out in the system.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

According to the exemplary embodiments of the present invention a device that has attributes that at least partially define the functionalities of the device may be overwritten or supplemented by newly received attributes. In this regard, new attributes can be sent to the device specifying one or more new functionalities of the device. Once the new attributes are received and stored in the electronic device, the electronic device has new functionality without making any changes to firmware.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
   storing, in a first device, one or more initial attributes that at least partially define a functionality of the first device;
   receiving, at the first device, at least one attribute that modifies the functionality of the first device, the at least one attribute originating from a remote server;
   evaluating, at the first device, the at least one attribute;
   determining, at the first device, if data is associated with the at least one evaluated attribute;
   if data is determined to be associated with the at least one evaluated attribute, storing the determined data in the first device;
   storing the at least one attribute in the first device; and
   performing, by the first device, one or more functions related to the modified functionality of the first device according to the at least one attribute,
   wherein each attribute of the one or more initial attributes and each attribute of the at least one attribute comprises a first field comprising a Universally Unique Identifier (UUID) and a distinct second field comprising a value associated with the UUID,
   and wherein receiving the at least one attribute that modifies the functionality of the first device comprises receiving the at least one attribute via short range communications.

2. The method of claim 1, wherein performing the one or more functions related to the modified functionality of the first device comprises instructing a second device to perform an action.

3. The method of claim 1, wherein each attribute further comprises a handle for referencing the corresponding attribute.

4. The method of claim 1, wherein storing the at least one attribute comprises overwriting at least one of the one or more initial attributes with at least one of the at least one attribute.

5. The method of claim 1, further comprising receiving, at the first device, the one or more initial attributes prior to storing the one or more initial attributes.

6. An apparatus comprising
   a memory configured to store attributes and data; and
   a controller configured to:
      store, in the memory, one or more initial attributes that at least partially define a functionality of the apparatus;
      receive at least one attribute that modifies the functionality of the apparatus, the at least one attribute originating from a remote server;
      evaluate at the first device, the at least one attribute;
      determine if data is associated with the at least one evaluated attribute;
      if data is determined to be associated with the at least one evaluated attribute, store the determined data;
      store the at least one attribute in the memory; and
      perform one or more functions related to the modified functionality of the apparatus according to the at least one attribute,
   wherein each attribute of the one or more initial attributes and each attribute of the at least one attribute comprises a first field comprising a Universally Unique Identifier (UUID) and a distinct second field comprising a value associated with the UUID, and wherein receiving the at least one attribute that modifies the functionality of the apparatus comprises receiving the at least one attribute via short range communications.

7. The apparatus of claim 6, wherein the controller is further configured to cause the apparatus to perform the one or more functions related to the modified functionality of the apparatus by instructing a separate device to perform an action.

8. The apparatus of claim 6, wherein each attribute further comprises a handle for referencing the corresponding attribute.

9. The apparatus of claim 6, wherein the controller is further configured to cause the apparatus to store the at least one attribute by overwriting at least one of the one or more initial attributes with at least one of the at least one attribute.

10. The apparatus of claim 6, wherein the controller is further configured to cause the apparatus to receive the one or more initial attributes.

11. A computer program product, the computer program product comprising at least one non-transitory computer-readable storage medium having computer-readable program code portions stored therein for execution by a processor in a first device, the computer-readable program code portions comprising:

a first executable portion for causing the first device to store one or more initial attributes that at least partially define a functionality of the first device;

a second executable portion for causing the first device to receive at least one attribute that modifies the functionality of the first device, the at least one attribute originating from a remote server;

a third executable portion for causing the first device to evaluate the at least one attribute; and to determine if data is associated with the at least one evaluated attribute;

a fourth executable portion for causing the first device to store the determined data if data is determined to be associated with the at least one evaluated attribute;

fifth executable portion for causing the first device to store the at least one attribute in the first device; and sixth executable portion for causing the first device to perform one or more functions related to the modified functionality of the first device according to the at least one attribute, wherein each attribute of the one or more initial attributes and each attribute of the at least one attribute comprises a first field comprising a Universally Unique Identifier (UUID) and a distinct second field comprising a value associated with the UUID, and wherein causing the first device to receive the at least one attribute that modifies the functionality of the first device comprises causing the first device to receive the at least one attribute via short range communications.

12. The computer program product of claim 11, wherein the fourth executable portion is configured to cause the first device to perform the one or more functions related to the modified functionality of the first device by instructing a second device to perform an action.

13. The computer program product of claim 11, wherein each attribute further comprises a handle for referencing the corresponding attribute.

14. The computer program product of claim 11, wherein the third executable portion is configured to cause the first device to store the at least one attribute by overwriting at least one of the one or more initial attributes with at least one of the at least one attribute.

15. The computer program product of claim 11, further comprising a fifth executable portion configured to cause the first device to receive the one or more initial attributes.

16. An apparatus of a first device comprising:
a memory configured to store attributes and data; and
a controller configured to:
receive, at the first device, at least one first attribute that modifies the functionality of the first device, the at least one attribute originating from a remote server;
evaluate, at the first device, the at least one first attribute;
determine, at the first device, if data is associated with the at least one evaluated first attribute;
if data is determined to be associated with the at least one evaluated first attribute, store the determined data in the first device;
store the at least one first attribute in the first device;
perform, by the first device, one or more functions related to the modified functionality of the first device according to the at least one first attribute;
generate, at the first device, one or more initial attributes that at least partially define a functionality of a second device that is remote to the first device;
generate, at the first device, at least one attribute value of the second device to modify the functionality of the second device and data associated with the at least one attribute value; and
send the at least one attribute value to the second device and the data associated with the at least one attribute value that is configured to perform one or more functions related to the modified functionality according to the at least one attribute,
wherein each attribute of the one or more initial attributes and each attribute of the at least one attribute value comprises a first field comprising a Universally Unique Identifier (UUID) and a distinct second field comprising a value associated with the UUID,
and where receiving the at least one first attribute that modifies the functionality of the first device comprises receiving the at least one first attribute via short range communications.

17. The apparatus of claim 16, wherein each attribute further comprises a handle for referencing the corresponding attribute.

18. The apparatus of claim 16, wherein the at least one attribute contains data that is associated with at least one of at least one new attribute and at least one of the one or more initial attributes.

19. A method comprising:
receiving, at a first device, at least one first attribute that modifies the functionality of the first device, the at least one first attribute originating from a remote server;
evaluating, at the first device, the at least one first attribute;
determining, at the first device, if data is associated with the at least one evaluated first attribute;
if data is determined to be associated with the at least one evaluated first attribute, storing the determined data in the first device;
storing the at least one first attribute in the first device;
performing, by the first device, one or more functions related to the modified functionality of the first device according to the at least one first attribute,
generating, at the first device, one or more initial attributes that at least partially define a functionality of a second device that is remote to the first device;

sending the one or more initial attributes from the first device to the second device;

generating, at the first device, at least one second attribute and data associated with the at least one second attribute to modify the functionality of the second device; and sending the at least one second attribute and the associated data to the second device that is configured to perform one or more functions related to the modified functionality according to the at least one second attribute, wherein each attribute of the one or more initial attributes and each attribute of the at least one second attribute comprises a first field comprising a Universally Unique Identifier (UUID) and a distinct second field comprising a value associated with the UUID, and wherein receiving the at least one first attribute that modifies the functionality of the first device comprises receiving the at least one first attribute via short range communications.

20. The method of claim 19, wherein each attribute further comprises a handle for referencing the corresponding attribute.

21. The method of claim 19, wherein the at least one other attribute contains data that is associated with at least one of at least one new attribute and at least one of the one or more initial attributes.

22. A method, comprising:

receiving, at a first electronic device, at least one first attribute that modifies the functionality of the first device, the at least one first attribute originating from a remote server;

evaluating, at the first electronic device, the at least one first attribute;

determining, at the first electronic device, if data is associated with the at least one evaluated first attribute;

if data is determined to be associated with the at least one evaluated first attribute, storing the determined data in the first electronic device;

storing the at least one first attribute in the first electronic device; and performing, by the first electronic device, one or more functions related to the modified functionality of the first electronic device according to the at least one first attribute, receiving, at the first electronic device, at least one second attribute that modifies a functionality of a second electronic device that stores one or more initial attributes that at least partially define the functionality of the second electronic device, the at least one second attribute originating from a remote server; and sending, from the first electronic device, the at least one second attribute to the second electronic device, causing the second electronic device to perform one or more functions related to the modified functionality of the second electronic device according to the at least one second attribute, wherein each attribute of the one or more initial attributes and each attribute of the at least one second attribute comprises a first field comprising a Universally Unique Identifier (UUID) and a distinct second field comprising a value associated with the UUID, and wherein receiving the at least one first attribute that modifies the functionality of the first device comprises receiving the at least one first attribute via short range communications.

23. The method of claim 22, further comprising, prior to said first electronic device receiving the at least one first attribute, receiving, by said first electronic device, the one or more initial attributes and sending the one or more initial attributes to the second electronic device.

24. The method of claim 22, wherein each attribute further comprises a handle for referencing the corresponding attribute.

25. Apparatus, comprising:

a memory configured to store attributes and data; and at least one processor; and a controller configured to:

receive, at the apparatus, at least one first attribute that modifies the functionality of the apparatus, the at least one first attribute originating from a remote server;

evaluate, at the apparatus, the at least one first attribute;

determine, at the apparatus, if data is associated with the at least one evaluated first attribute;

if data is determined to be associated with the at least one evaluated first attribute, store the determined data in the apparatus;

store the at least one first attribute in the apparatus;

perform, by the apparatus, one or more functions related to the modified functionality of the apparatus according to the at least one first attribute;

receive at least one second attribute and data associated with the at least one second attribute that modifies a functionality of another apparatus that stores one or more initial attributes that at least partially define the functionality of the other apparatus, the at least one second attribute originating from a remote server; and send the at least one second attribute and associated data to the other apparatus, causing the other apparatus to perform one or more functions related to the modified functionality of the other apparatus according to the at least one second attribute, wherein each attribute of the one or more initial attributes and each attribute of the at least one second attribute comprises a first field comprising a Universally Unique Identifier (UUID) and a distinct second field comprising a value associated with the UUID, and wherein receiving the at least one first attribute that modifies the functionality of the first device comprises receiving the at least one first attribute via short range communications.

26. The apparatus of claim 25, wherein said at least one second attribute is sent to the other apparatus via a short range communication.

27. The apparatus of claim 25, wherein each attribute further comprises a handle for referencing the corresponding attribute.

28. The apparatus of claim 25, wherein the controller is further configured to cause the apparatus to, prior to receiving at least one attribute, receive the one or more initial attributes and send the one or more initial attributes to the other apparatus.

* * * * *